US005697468A

United States Patent [19]
Russell, Jr. et al.

[11] Patent Number: 5,697,468
[45] Date of Patent: Dec. 16, 1997

[54] SPOILER SYSTEM FOR GROUND EFFECT VEHICLES

[75] Inventors: William F. Russell, Jr., Westport, Conn.; John Roncz, Elkhart, Ind.

[73] Assignee: Flarecraft Corporation, Westport, Conn.

[21] Appl. No.: 706,747

[22] Filed: Sep. 9, 1996

Related U.S. Application Data

[63] Continuation of Ser. No. 407,599, Mar. 20, 1995, abandoned, which is a continuation-in-part of Ser. No. 317,496, Oct. 4, 1994, abandoned.

[51] Int. Cl.⁶ .................................. B60V 1/08; B60V 1/11
[52] U.S. Cl. ............................ 180/116; 180/118; 244/203; 244/213
[58] Field of Search ................................... 180/116, 117, 180/118, 120; 244/12.1, 203, 213

[56] References Cited

U.S. PATENT DOCUMENTS

| | | | |
|---|---|---|---|
| 2,261,363 | 11/1941 | Griswold, 2d | 244/213 |
| 3,144,220 | 8/1964 | Kittelson | 244/203 |
| 3,261,419 | 7/1966 | Kaario | 180/120 |
| 3,627,235 | 12/1971 | Lippisch | 244/12.1 |
| 3,831,887 | 8/1974 | Fosness | 244/12.1 |
| 3,860,200 | 1/1975 | Petrushka | 244/12.1 |
| 5,314,035 | 5/1994 | Schoell | 180/117 X |
| 5,335,742 | 8/1994 | Blum | 180/117 |
| 5,566,775 | 10/1996 | Schoell | 180/117 X |

*Primary Examiner*—Victor E. Johnson
*Attorney, Agent, or Firm*—Lieberman & Nowak, LLP

[57] ABSTRACT

A ground effect vehicle wherein a flap coupled to a spoiler is provided on the wings in order to break lift when the craft starts to leave ground effect travel in order to avoid flight out of ground effect.

6 Claims, 3 Drawing Sheets

SPOILER SYSTEM FOR GROUND EFFECT VEHICLES

CROSS-REFERENCE TO RELATED APPLICATIONS

This application is a continuation of application Ser. No. 08/407,599, filed Mar. 20, 1995, now abandoned, which is itself a continuation-in-part of Ser. No. 08/317,496, filed Oct. 4, 1994, now abandoned.

BACKGROUND OF THE INVENTION

1. Field of the Invention

The invention relates to the transportation industry, and, in particular, to craft that are able to travel at low altitudes over water and land, based on ground effect principles.

2. Background Information

Conventional boats, long the choice for travel across expanses of water, have a number of disadvantages when used as modes of transportation. Since conventional boats are constantly displacing water they are limited in speed due to hydrodynamic drag. Hydrodynamic drag slows conventional boats due to both friction and the surface tension which makes the water adhere to the boat. Due to this drag, conventional boats require powerful motors to achieve high speeds and are fuel inefficient. In addition, the ride in a conventional high power boat is rough due to the fact that the boat will hit every wave crest.

Another choice for travel is a light plane. However, planes are expensive due to high insurance, regulation and licensing costs.

For more than sixty years, the principles of "ground effect" have been known and have been used with mixed success to provide craft that can fly at very low altitudes over water and land, thus providing a method of avoiding the disadvantages of conventional boats and light planes. Craft that cruise in the cushion of air provided by the pressure between the wings and the ground or water take advantage of "ground effect." Craft that utilize the principles of "ground effect" avoid contact with the water at cruising speed, thus avoiding the disadvantages associated with hydrodynamic drag, and operate much more smoothly and efficiently than conventional boats. Furthermore, if a "ground effect" craft is made incapable of achieving normal flight, the high costs of planes can be avoided.

"Ground effect" can be best defined through an analysis of Bernoulli's Principle. Bernoulli's Principle observes that as air gains speed, it loses pressure; as it loses speed, it gains pressure. Kinetic energy and pressure are mutually interchangeable forms of energy in a fluid such as air.

Normally air moves in straight lines. As air moves past an object, the normal straight-line flow is deflected into longer paths around the object. The long path forces the flow to speed up, thereby momentarily losing pressure. If an object is asymmetrical, the flow path along the longer side will cause the air to speed up and thus momentarily have a loss of pressure. Wings are an example of asymmetrical objects and are designed so that the loss of pressure on the top of the wing is greater than underneath the wing in order to induce lift. Symmetrical wings also work well in ground effect as long as they are at an angle to the ground.

The highest positive pressure that can act on a wing is stagnation or ram pressure. This occurs when flowing air is brought to rest or stagnated. When this occurs all of the kinetic energy of the air is transformed into pressure. During conventional air flight of air planes at normal cruising altitudes, this pressure appears only in a narrow region of the under surface of the wing, near the leading edge.

Vehicles which utilize the ground effect principle have designs which attempt to spread this high pressure or ram pressure area throughout the entire underside of the vehicle. One known design of a wing for ground effect vehicles includes the placing of the trailing edge of the wing as close to the water surface as possible. By this design the entire space under the wing is rammed full of slow moving air, whose pressure is now close to the stagnation value. Ground effect vehicles attempt to maximize slow moving or stagnate air under the wing's surface, thereby increasing the efficiency of the vehicle in ground effect flight. The prior art teaches that the ideal design would seal the trailing edge of a ground effect craft's wing perfectly against the land or water in order to achieve full stagnation pressure under the wing, thereby creating the greatest amount of lift for the craft and be the most efficient. This has generally found to be impractical, however, due to the fact that no surface is completely flat and in the case of water there must be wave clearance. This clearance is necessary in order to avoid damage to the wing or the craft.

One disadvantage that is inherent in most designs for ground effect vehicles which try to achieve the "perfect seal" is that the designs call for the trailing edge of the wing to be the lowest point on the craft. This means that the trailing edge is the last surface of the craft to leave the water and the surface upon which the craft lands. The trailing edge of the wing therefore bears much, if not most, of the brunt of takeoffs and landings. In order to strengthen the trailing edge, some designers have added weight to that portion of the wing. This added weight, however, changes the center of gravity of the craft.

Despite the impracticality of achieving the "perfect seal", ground effect travel is highly efficient because hydrodynamic drag is greatly reduced, if not eliminated, once the ground effect craft leaves the water and reaches cruising speed and altitude.

Other sources of drag, including skin friction and wake drag, remain. In addition, the higher-pressure air in the flow underneath the wing spreads outward, towards the wing tips. The low pressure flow on the top of the wing is pushed inward by the atmospheric pressure, towards the fuselage. At the tip of each wing, the higher pressure air from underneath the wing spills off and curls upward into the low pressure zone above the wing and wraps around it to form a wing tip vortex. Power is necessarily consumed in generating these vortices and the result is called induced drag.

The velocity field of the wing tip vortices creates a downwash, thereby slanting the entire airflow downward slightly. Lift acts perpendicular to the air flow, so this downwash tilts the lift vector back slightly. The tilted vector is composed of a vertical component (true lift) and a smaller horizontal component (induced drag).

During ground effect travel there is no place for the downwash to go, so the lift vector returns to near vertical; and, its horizontal component (induced drag) becomes very small. The reduction in induced drag is one of the most desirable features of travel according to ground effect principles, because it greatly reduces the power that is required for moving the craft In conventional air flight, peak pressure on the wing's under surface is located near the leading edge. In ground effect, however, the high pressure spreads to cover most of the under surface. The center of lift moves rearward, thereby causing the wing to pitch down as it settles into ground effect and to pitch upward as it rises out from ground effect. Stable ground effect travel would be difficult if the craft nosed over as it approached the surface, which is what will happen with typical wing planforms.

In the prior art, one way to make the wing pitch stable was to sweep the tips forward, thereby creating a reverse-delta platform. In free flight, lift decreases towards the wing tips, because the high pressure from beneath the wing spills off the tips. In ground effect, this spillage is greatly reduced by the closeness to the surface, so the wing gains lift fastest at the tips. As a reverse delta wing settles into ground effect travel, its tips lift faster than the remaining portion of the wing. Because the wings are swept far forward, the lift near the tips helps to counters the natural pitch down tendency.

There are a number of patents which deal generally with the use of ground effect to attempt to provide more efficient travel over water or land. Such patents include for example, U.S. Pat. Nos. 3,190,582, 3,627,235, 3,661,111, 3,830,179 and 3,830,448, all to Lippisch.

The ground effect craft disclosed in Lippisch and others in use have encountered certain problems that have prevented widespread use. As discussed above, there are problems inherent in the designs which maintain the trailing edge of the wing as the lowest point on the craft in order to achieve the perfect seal.

If the craft loses the benefits of ground effect travel, the craft becomes airborne, which can be dangerous to a craft not designed for normal flight. Furthermore, the federal regulations that apply to airplanes would have to be applied to ground effect craft if they were capable of conventional air flight, thus undermining some of the cost benefits of ground effect travel. Therefore, it is desirable to provide a way of automatically preventing the ground effect craft from achieving conventional air flight.

Another inefficiency found in prior art ground effect craft is caused by the power necessary to achieve ground effect flight. The conventional ground effect craft starts and ends its trip in water. While it is in the water the craft is subject to the same hydrodynamic drag that makes a boat so inefficient. At low speeds, when the craft is in displacement mode, hydrodynamic drag increases. It takes high powered engines to produce the thrust necessary to overcome the hydrodynamic drag, which increases as as the square of the speed. This primary source of drag does not disappear until the craft achieves ground effect flight. Since water is 850 times denser than air, the drag is highest when the craft is still in the water. Therefore, it is obviously of value to break the surface in order to achieve ground effect flight as soon as possible.

One of the most disadvantageous aspects of the prior art craft is that they must be overpowered in order to produce the necessary thrust to overcome the hydrodynamic drag and achieve ground effect flight. The conventional ground effect craft is powered by an engine coupled to a propeller. This combination must produce enough thrust to overcome the drag, but once ground effect flight is achieved, a strong engine is not necessary to maintain travel and increase speed. The number of passengers and payload is limited due to the extra power needed to overcome the initial drag. It is therefore desirable to provide an alternative power source to the craft for times when high power is needed and to enable the alternative power source to be disconnected when ground effect flight is achieved. This would enable the use of smaller, more efficient engines to be used only during ground effect flight.

Another disadvantage in the prior art craft is the fact that, by design, the nose of ground effect craft leave the water first. This results in the trailing edge being lowered into the water, thus inhibiting takeoff. The ability to take off without rotating the craft is desirable and will result in early achievement of ground effect flight.

SUMMARY OF THE INVENTION

The present invention relates to the addition of a feature to the design of craft used for ground effect travel. A ground effect craft is provided with excess power to ensure that it can lift off from the water and achieve ground effect flight in a reasonably short distance. However this excess power is enough to enable the craft to achieve conventional air flight and be classified as an airplane (with the attendant licensing and regulatory costs). In order to achieve the desired effect of avoiding conventional air flight, a coupled spoiler system is added to the design of the wing comprising a flap on the underside of the wing and a spoiler on the top of the wing. This coupled spoiler system acts to break lift whenever the craft starts to leave ground effect travel and prevents the craft from achieving conventional air flight.

DETAILED DESCRIPTION OF THE PREFERRED EMBODIMENTS

While the invention will be described in connection with a preferred embodiment, it will be understood that it is not intended to limit the invention to the described embodiment. On the contrary, it is intended to cover all alternatives, modifications and equivalents as may be included within the spirit and scope of the invention as defined by the appended claims. The features of this invention can be utilized with any design or construction of a ground effect vehicle that is known in the art.

Figure 1:
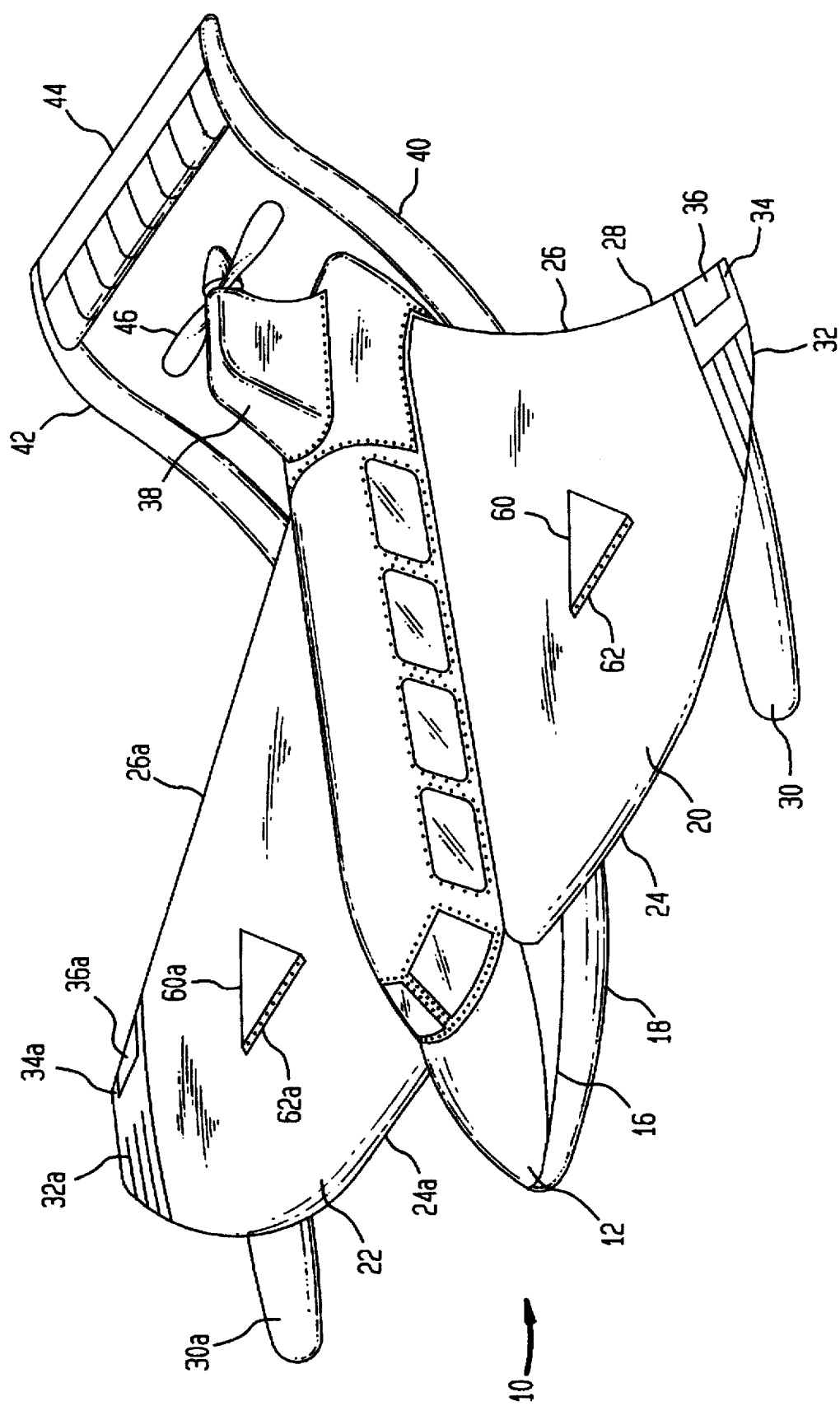
FIG. 1 represents a perspective view of a ground effect vehicle according to the present invention.
Figure 2:
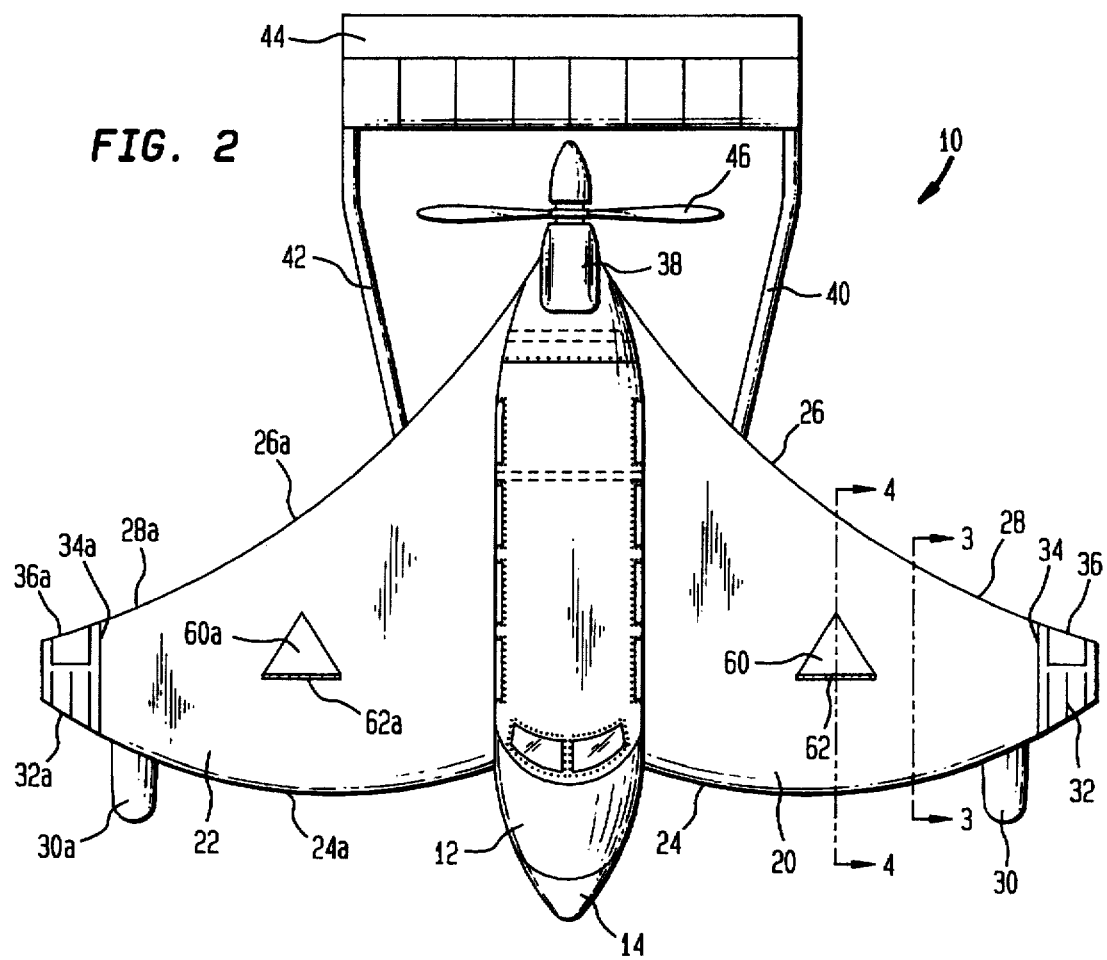
FIG. 2 is a front overview of the vehicle depicted in FIG. 1.

Turning to FIGS. 1 and 2, the ground effect craft 10 has a fuselage 12 within which there is a cabin and cockpit for passengers and a pilot. Adequate room may be provided in the fuselage for storage of various types of cargo. At the bottom of the fuselage 12 is a hull 14 which in the preferred embodiment of the invention is the lowest point on the craft and is the surface from which the craft takes off and lands.

One preferred design of the hull 14 includes a number of surfaces 16 and 18 to make the hull 14 travel more efficiently through the water. Wings 20 and 22 are provided at the side of the fuselage 12. In most applications, the standard reverse delta ground effect wing may be used. The wing span of the craft can be any length, but in the preferred embodiment, the wingspan is approximately twenty-one feet. In the preferred embodiment the wings 20 and 22 are each provided with a leading edge 24 and 24a and trailing edges 26 and 26a.

While prior art designs have required that the trailing edges 26 and 26a be the lowest point on the craft and prior designers have believed that the closer the trailing edge is to the surface to be traveled, whether water or land, the better lift is achieved, the inventors of the present invention have surprisingly discovered that there is constant lift up to approximately five inches off the surface. This discovery has allowed the design of the craft 10 of the present invention to place the trailing edges 26 and 26a off the water or land and higher up on the hull 14 than other conventional ground effect craft. This is illustrated by the positioning of the trailing edges 26 and 26a above the hull 14 at a point where the trailing edges 26 and 26a are above the surface to be travelled at a distance of up to five percent of the wing span of the craft. In the preferred embodiment which has a wingspan of approximately twenty one feet, it is preferred that the trailing edges 26 and 26a of the wings is approximately six inches above the water or the land. This placement of the trailing edges 26 and 26a allows the hull 14 to absorb the brunt of the impact of take offs and landings while still allowing for the lift due to ground effect.

At the outer edge 28 of each wing 20 and 22, downwardly extending pontoons 30 and 30a may be positioned, along with upwardly extending winglets 32 and 32a. Along a rear surface 34 and 34a of the winglets, rudders 36 and 36a may be provided.

Extending upward from the rear of the hull 14, twin vertical stabilizers 40 and 42 may be provided. In another embodiment a single vertical stabilizer is provided. A horizontal stabilizer 44 preferably connects the upper edges of the vertical stabilizers 40 and 42.

One preferred embodiment of the craft of the present invention includes a propeller engine combination for powering the craft. On the top of the fuselage 12, a housing 38 is provided. Within the housing 38, a motor is positioned to which a multi-bladed ducted fan 46 is attached.

One of the features of the invention is that it provides a means for preventing the craft 10 from achieving conventional air flight. One way of preventing this air flight is a coupled spoiler system, which is shown in part in FIGS. 1 and 2 as spoilers 60 and 60a on the top of the wings 20 and 22. These spoilers 60 and 60a are attached to the top of the wing by means of a hinge 62 and 62a, preferably a piano hinge. This feature of the present invention is illustrated in more detail and explained more fully in FIGS. 3, 4 and 4a.

Figure 3:
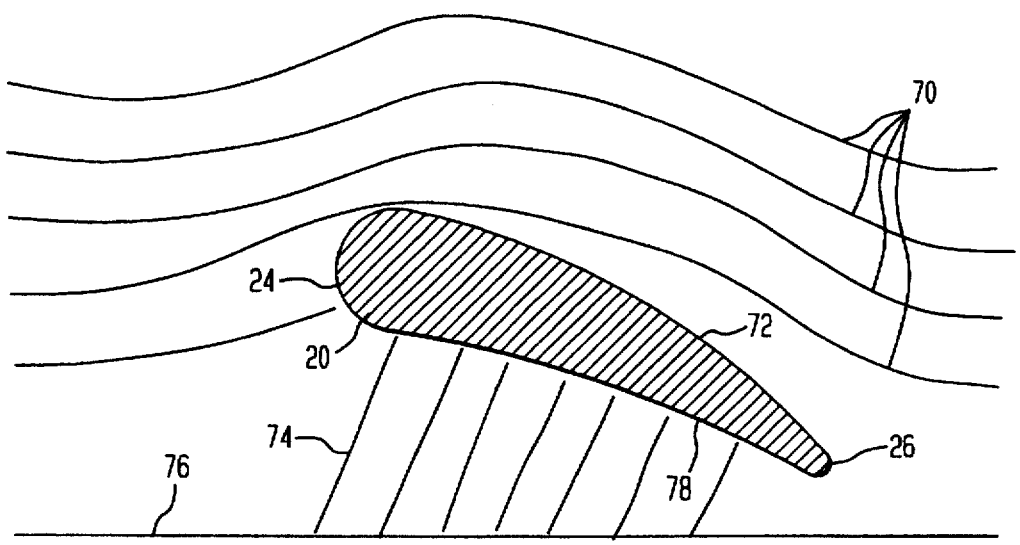
FIG. 3 is a cross-section view of one wing of the vehicle of FIG. 2 taken at line 3—3, illustrating the air flows found during ground effect flight.

FIG. 3 is a cross-section view of the wing 20 of FIG. 2 at line 3—3. The wing 20 has a leading edge 24 and a trailing edge 26. The air flow is shown by horizontal lines 70 which travel over the top side 72 of the wing 20. The close to vertical lines 74 illustrate the stagnant air which forms the ram pressure and allows the high pressure lift of ground effect. This stagnant air 74 is trapped between the water surface 76 and the under side of the wing 78. In close proximity to the ground, the stagnant air 74 remains nearly motionless and thus ground effect lift is maintained. Spoilers are well known in the art of airplanes. However, the application of a spoiler system to a ground effect vehicle to ensure that the ground effect vehicle does not leave ground effect is new. Therefore, any spoiler system which acts to cause a breakdown of lift above the wings upon the disappearance of stagnant air under the wings will work to maintain a ground effect vehicle in ground effect flight. Therefore, the design of a spoiler for the inventive function is dependent on the design of the specific ground effect craft to which it is to be applied.

Figure 4:
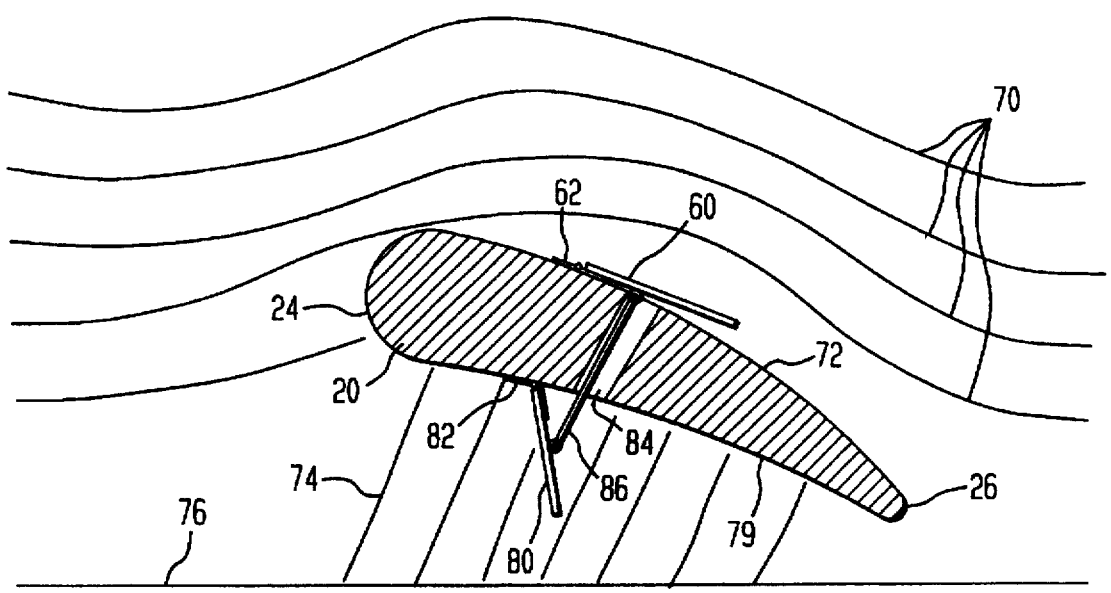
FIG. 4 is another cross-section view of one wing of the vehicle of FIG. 2 taken at line 4—4, illustrating the coupled spoiler system of the present invention in ground effect flight.

Turning to FIG. 4, a cross-section view of wing 20 of FIG. 2 at line 4—4, there is illustrated a preferred embodiment of one feature of the present invention. Illustrated is a coupled spoiler system which, in one embodiment comprises a spoiler 60 and a bottom flap 80. The spoiler 60 and bottom flap 80 can be made of any configuration. The leading edge of the spoiler 60 and flap 80 are connected to the top 72 and bottom 78 of the wing by a hinge 62 and 82 respectively. The hinges 62 and 82 are preferably piano hinges.

In one preferred embodiment, a channel 84 is furnished which travels from the top of the wing 72 to the bottom of the wing 78. Through this channel 84 is placed a pipe or rod 86 which is attached to the spoiler 60 and the bottom flap 80. The channel 84 has a wide enough diameter to accommodate the rod 86 as it moves up and down within the channel. In the desired ground effect state, the bottom flap 80 hangs down from the underside 78 of the wing 20, undisturbed by the stagnant air 74 and the spoiler 60 is flat on the top side 72 of the wing 20.

Figure 4A:
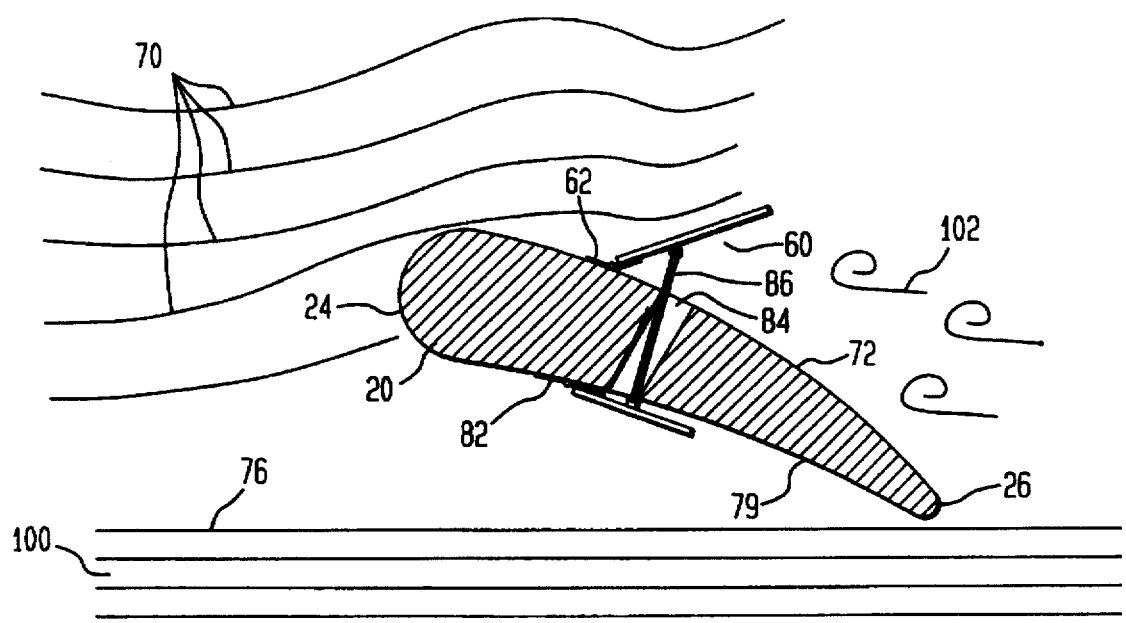
FIG. 4a is another cross-section view of one wing of the vehicle of FIG. 2 taken at line 4—4, illustrating the coupled spoiler of the present invention in the position necessary to prevent normal flight from occurring.

Turning to FIG. 4a the effect of a rise in altitude is illustrated. As the craft speeds up it will increase in height above the water (or land surface). The air will no longer be trapped under the wing, and instead begins to flow normally. This results in moving air 100 passing under the bottom 78 of the wing 20. As this normal airflow under the wing resumes, the additional lift provided by ground effect pressure disappears, and the induced drag increases dramatically because the tip vortices can now form. The decrease in lift and increase in drag as the craft gains height helps to keep the craft at low altitudes. As discussed above, regular air flight is not desired in a ground effect craft.

When the trailing edge of the wing 26 is touching the water, the airspeed under the wing would be zero. As an illustration, if one tried to fly a flag under the wing under this condition, it would hang limp, regardless of the speed of the craft. But as the craft gains altitude, the airspeed under the wing increases and the flag would start flying. Moving air has kinetic energy which, when brought to a stop, creates a pressure known as dynamic pressure, which can be computed as one half the air density times the airspeed (measured in feet per second) squared. Thus doubling the speed increases the dynamic pressure by a factor of four. In this invention the increase in dynamic pressure pushes on the bottom flap 80 which in turn activates the spoiler 60 on top of the wing. This works well because near the water almost all the lift is coming from the bottom of the wing, but once the craft gains altitude, most of the lift comes from the top of the wing.

The coupled spoiler system acts to prevent the craft from achieving conventional air air flight. When the craft gains altitude and the air 100 under the wing 20 begins to flow, the dynamic pressure of the air increases as the craft speeds up until there is sufficient air power to push the bottom flap 80 towards its retracted position illustrated in FIG. 4a. Since the spoiler 60 and flap 80 are coupled by the rod 86, the movement of flap 80 causes the spoiler 60 to rise above the top of the wing 20. The effect of the deployment of spoiler 60 is to disturb the flowing air 70, disrupting the wing's ability to produce lift and increasing its drag. When spoiler 60 is fully opened, it completely disrupts the flow of air above the wing, creating whorls 102. The resulting loss of lift will prevent the ground effect craft from increasing its height above the surface. Eventually, the craft will stabilize at a height at which the spoiler is only partially deployed.

By varying the size or mechanical advantage of the flap 80 on the bottom of the wing, or the size or configuration of the spoiler 60 above the wing or the relative gearing ratio between the two, the effect of the inventive spoiler system can be tailored to keep the craft at a desired height for a large variety of ground effect vehicles.

We claim:

1. A vehicle capable of ground effect mode travel over or on water or land, said vehicle comprising:

a fuselage;

a hull disposed below the fuselage, the hull having a left side and right side;

a pair of opposite side wings attached to the fuselage, each wing having a top surface, a bottom surface and an outer edge;

vehicle propulsion means attached to the fuselage for propelling the vehicle at ground effect flight; and means for automatically adjusting the vehicle altitude to prevent conventional air flight wherein said means for automatically adjusting said vehicle altitude to prevent conventional air flight comprises a spoiler system on each wing, said spoiler system comprising:

a downwardly depending flap attached to a hinge on the bottom surface of the wing, the flap being capable of shifting position in reaction to air flow along the bottom surface of the wing; and a spoiler connected to a hinge on the top surface of the wing, said flap and said spoiler being operably connected together whereby when said flap shifts position in an upward direction in reaction to air flow along the bottom surface of the wing, said spoiler shifts position to prevent conventional air flight.

2. The vehicle of claim 1 wherein a pontoon is attached to and downwardly extended from the outer edge of each of the wings.

3. The vehicle of claim 1 wherein a vertical stabilizer is attached to and upwardly extended from each side of the hull, each vertical stabilizer having an upper edge.

4. The vehicle of claim 3 wherein a horizontal stabilizer is attached to the upper edges of each vertical stabilizer.

5. The vehicle of claim 1 wherein the vehicle propulsion means comprises: a multi-bladed, ducted fan attached to a motor, the fan/motor combination disposed inside a housing, the housing mounted on top of the fuselage.

6. A vehicle capable of ground effect mode travel over or on water or land said vehicle comprising:

a fuselage;

a hull disposed below the fuselage, the hull having a left side and a right side;

a pair of opposite side wings attached to the fuselage, each wing having a top surface, a bottom surface and an outer edge;

vehicle propulsion means attached to the fuselage for propelling the vehicle at ground effect flight; and means for automatically adjusting vehicle altitude to prevent conventional air flight wherein said means for automatically adjusting said vehicle altitude to prevent conventional air flight comprises a spoiler system on each wing said spoiler system comprising:

a downwardly depending flap attached to a hinge on the bottom surface of the wing the flap being capable of shifting from a deployed position to a retracted position and from said retracted position to said deployed position in reaction to air flow along the bottom surface of the wing; and a spoiler coupled to the flap such that said spoiler is deployed into the air flow along the top surface of the wing of the vehicle as said flap is shifted into said retracted position to thereby disrupt the air flow along the top surface of the wing, and said spoiler is retracted out of the air flow along the top surface of the wing of the vehicle as said flap is shifted into said deployed position.

* * * * *